(12) United States Patent
Wisniewski

(10) Patent No.: US 7,246,678 B2
(45) Date of Patent: *Jul. 24, 2007

(54) SATELLITE SENSOR HOUSING

(75) Inventor: Andrew J. Wisniewski, South Lyon, MI (US)

(73) Assignee: Siemens VDO Automotive Corporation, Auburn Hills ( * ) Notice: Subject to any disclaimer, the term of this patent is extended or adjusted under 35 U.S.C. 154(b) by 97 days.

This patent is subject to a terminal disclaimer.

(21) Appl. No.: 11/091,034

(22) Filed: Mar. 28, 2005

(65) Prior Publication Data

US 2005/0236212 A1 Oct. 27, 2005

Related U.S. Application Data

(63) Continuation of application No. 10/460,846, filed on Jun. 13, 2003, now Pat. No. 6,932,181.
(60) Provisional application No. 60/396,353, filed on Jul. 16, 2002.

(51) Int. Cl.
*B60R 21/00* (2006.01)

(52) U.S. Cl. .............. 180/282; 180/274; 200/61.45 R; 439/34

(58) Field of Classification Search .............. 439/76.1, 439/76.2, 34; 180/282, 274; 307/10.1; 200/61.45 R, 200/61.44; 280/728.2, 734; 403/13, 14, 403/279, 280, 282, 283, 408.1
See application file for complete search history.

(56) References Cited

U.S. PATENT DOCUMENTS 5,636,891 A * 6/1997 Van Order et al. ........ 296/37.7
5,945,606 A * 8/1999 Tokunaga et al. ............. 73/756
6,188,019 B1 * 2/2001 Baur et al. ..................... 174/51
6,264,232 B1 7/2001 Clark ....................... 280/728.2
6,435,017 B1 * 8/2002 Nowicki et al. .............. 73/116
6,932,181 B2 * 8/2005 Wisniewski ................. 180/282

FOREIGN PATENT DOCUMENTS

DE 197 02 695 C1 * 2/1998
DE 197 07 421 C2 * 9/1998
WO WO 98/19892 A1 5/1998

* cited by examiner

*Primary Examiner*—Ruth Ilan

(57) ABSTRACT

A satellite sensor assembly includes a plastic sensor housing that is mounted to a vehicle structure comprised of sheet metal. The sensor housing includes a transversely extending tab that is received within an opening formed in the sheet metal. The tab includes a pair of crush ribs that extend along the length of the tab. The ribs deform as the tab is inserted through the opening to achieve an interference fit. The inference fit serves to hold the housing in place until the housing can be separately fastened to the sheet metal with a fastener.

19 Claims, 2 Drawing Sheets

SATELLITE SENSOR HOUSING

CROSS-REFERENCE TO RELATED APPLICATIONS

This application is a continuation of Ser. No. 10/460,846, which was filed on Jun. 13, 2003 now U.S. Pat. No. 6,932,181, and which claims priority to U.S. Provisional Application Ser. No. 60/396,353, which was filed on Jul. 16, 2002.

BACKGROUND OF THE INVENTION

This invention relates to a method and apparatus for installing a satellite sensor within a vehicle.

Vehicles include various different sensors that measure a variety of vehicle characteristics during vehicle operation. For example, sensors are used to measure vertical acceleration, lateral acceleration, roll-over angular rate, etc. These sensors are mounted at various different locations throughout the vehicle. A vehicle control unit uses information from the various sensors to determine whether conditions are appropriate for deploying a safety restraint device, such as an airbag.

Typically, a main or center tunnel sensor assembly is mounted to a vehicle structure at a central location within the vehicle. This center tunnel sensor assembly is used to measure various vehicle characteristics that occur near the center of the vehicle. Satellite sensor assemblies are used to measure vehicle characteristics that occur at satellite vehicle locations, i.e., vehicle locations remotely positioned relative to the center of the vehicle.

The satellite sensors are typically mounted to vehicle structures at locations remote from a center vehicle position. For example, satellite sensors can be mounted at the front or rear of the vehicle, or can be mounted along the sides of the vehicle near the vehicle doors. These sensor assemblies include printed circuit boards and associated electronics that are enclosed within a housing.

During sensor installation, the housing is attached to a vehicle structural component with fasteners. Due to the small size of the satellite sensor housing and the limited packaging space available within the vehicle, it is often difficult to mount the housing to the vehicle. Two hands are required to properly position the sensor housing, hold the sensor housing in place, and fasten the housing to the vehicle structure.

Further, during assembly the sensor assembly can be jostled or bumped against adjacent vehicle components. This can loosen sensor and electronic components mounted within the housing, leading to inaccurate vehicle characteristic measurements.

Thus, there is a need for a satellite sensor assembly that can be quickly and easily installed without introducing unwanted vibrations to the sensor components during assembly, as well as overcoming the other above-mentioned deficiencies with the prior art.

SUMMARY OF THE INVENTION

A sensor housing includes a transversely extending tab that is received within an opening formed in a vehicle structure in an interference fit. The interference fit holds the sensor housing in the proper orientation and prevents rotation of the housing as the housing is separately fastened to the vehicle structure with a fastener.

Preferably, the tab includes a pair of crush ribs that extend in a direction parallel to a longitudinal axis defined by the tab. The crush ribs are preferably positioned on opposing sides of the tab. Each crush rib includes a base portion that extends to a crush tip. The base portion is of greater thickness than the crush tip. As the tab is inserted into the opening, the crush ribs deform in a direction that is transverse to the linear insertion force applied along the longitudinal axis.

The method for mounting the sensor assembly to the vehicle includes the following steps. The sensor housing is positioned adjacent to the vehicle structure. A housing tab is aligned with an opening in the vehicle structure, and a portion of the tab is deformed during insertion of the tab into the opening to establish an interference fit. Then the sensor housing is fastened to the vehicle structure with a fastener.

The subject invention provides a simplified sensor assembly that can be quickly and easily installed without introducing unwanted vibrations to the sensor components during assembly. Further, an installer is not required to separately hold the housing in place and hold the fastener in place during the fastening step. These and other features of the present invention can be best understood from the following specifications and drawings, the following of which is a brief description.

DETAILED DESCRIPTION OF A PREFERRED EMBODIMENT

Figure 1:
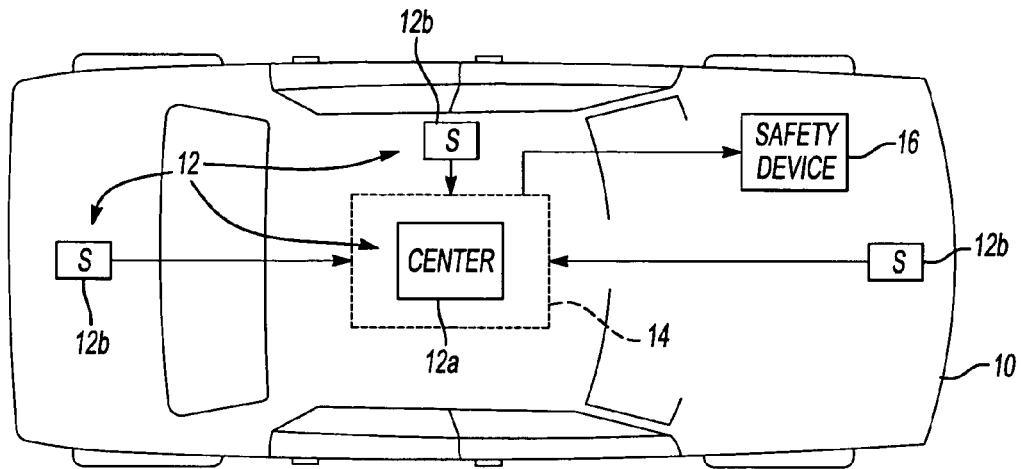
FIG. 1 is a schematic view of a vehicle incorporating a plurality of sensor assemblies.

As shown in FIG. 1, a vehicle 10 includes various different sensors, shown generally at 12, which measure a variety of vehicle characteristics during vehicle operation. These sensors 12 are mounted at various different locations throughout the vehicle 10. A vehicle control unit 14 uses information from the various sensors 12 to determine whether conditions are appropriate for deploying a safety restraint device 16, such as an airbag.

The sensors 12 preferably include a main or center tunnel sensor assembly 12*a* that is mounted at a central location within the vehicle 10. This center tunnel sensor assembly 12*a* is used to measure various vehicle characteristics that occur near the center of the vehicle. Satellite sensors 12*b* are typically mounted at locations remote from the center vehicle position. The satellite sensor assemblies 12*b* are used to measure vehicle characteristics that occur at satellite vehicle locations, i.e., vehicle locations remotely positioned relative to the center of the vehicle 10. Together, the sensors 12*a* and 12*b* measure vehicle characteristics such as vertical acceleration, lateral acceleration, roll-over angular rate, etc., for example, and generate corresponding sensor signals representative of these characteristics.

Preferably, each sensor assembly 12 includes a housing 18, at least one sensor component 20, a printed circuit board (PCB) 22, and associated sensor and control electronics 24. The sensor component 20, PCB 22, and electronics 24 are enclosed within an inner cavity 26 defined by an inner surface 28 of the housing 18.

Figure 2:
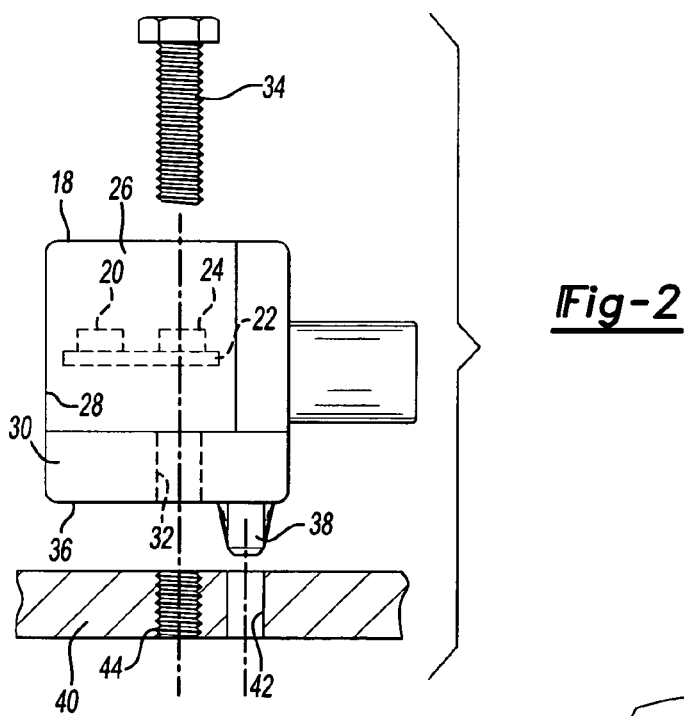
FIG. 2 is an exploded view of a sensor assembly incorporating the subject invention.

The housing 18 includes a mounting portion 30 with an aperture 32 that receives a fastener 34, see FIG. 2. The housing 18 also includes a tab 38 that extends outwardly from an exterior surface 36 of the housing 18. The aperture 32 is open to the exterior surface 36 and is positioned adjacent to the tab 38.

Figure 3:
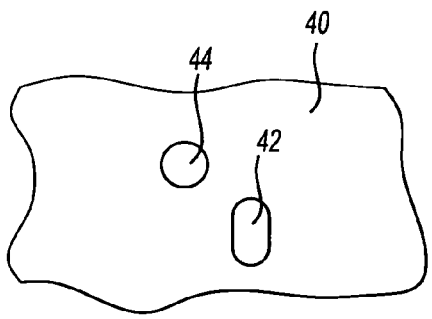
FIG. 3 is a schematic view of a vehicle structure to which the sensor assembly is mounted.

The housing 18 is mounted to a vehicle structure 40, shown in FIGS. 2 and 3, that is preferably a sheet metal structure. The tab 38 is received within a first opening 42 formed in the vehicle structure 40 in an interference fit. The interference fit holds the housing 18 in the proper installation orientation until the housing 18 can be separately and securely fastened to the vehicle structure 40 with the fastener 34. The interference fit also prevents the housing from spinning or vibrating during the fastening assembly step.

The vehicle structure 40 includes a second opening 44 that receives the fastener 34. During installation, the tab 38 is fit into the first opening 42, which simultaneously aligns the aperture 32 with the second opening 44 in the vehicle structure 40. Preferably, the first opening 42 is slot-shaped and the second opening is circular, however, other shapes could also be used.

Figure 4:
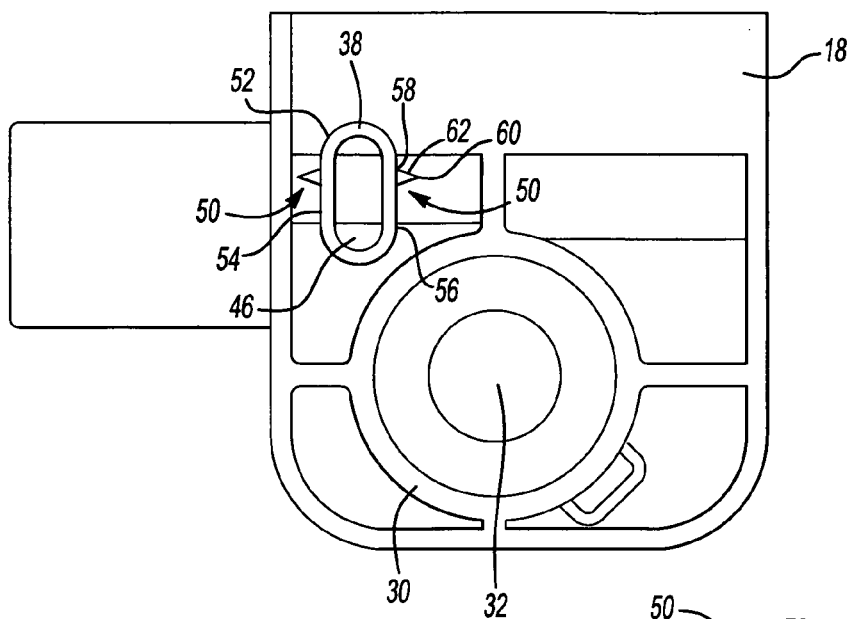
FIG. 4 is a front view, partially broken away, of a sensor housing incorporating the subject invention.

The tab 38 includes at least one extension member 50 that extends outwardly from an exterior surface 52 of the tab 38, see FIG. 4. Preferably, a pair of extension members 50 is formed on the tab 38, with one extension member 50 being positioned on one side 54 of the tab 38 and the other extension member 50 being positioned on an opposite side 56 of the tab 38. Each extension member 50 includes a base portion 58 that extends to a distal tip 60 to define an extension member height. The base portion 58 is thicker than the distal tip 60. Preferably, a tapered surface 62 extends from the base portion 58 to the distal tip 60, to form a triangular shape.

The housing 18, tab 38, and extension members 50 are preferably formed from a plastic material. The extension member height, together with the height of the tab 38, define a diameter that is greater than the diameter of the first opening 42. Thus, the tab 38 is inserted into the first opening 42, the extension members 50 are permanently or plastically deformed or crushed to form the interference fit between the housing 18 and the vehicle structure 40.

Figure 5:
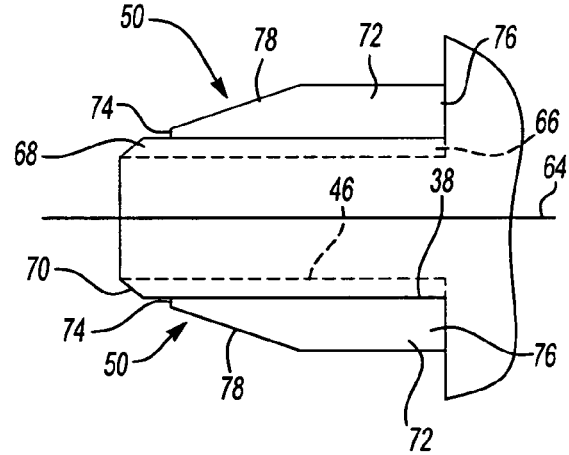
FIG. 5 is a side view, partially broken away, of a sensor housing incorporating the subject invention.

As shown in FIG. 5, the tab 38 defines a longitudinal axis 64 that extends along the length of the tab 38. The tab 38 includes a base portion 66 that extends to a distal tip 68. The distal tip 68 preferably includes a chamfered or tapered surface 70 to facilitate insertion and alignment of the tab 38 into the first opening 42. A bore 46 is preferably formed within the tab 38 for weight reduction.

The extension members 50 are preferably formed as crush ribs 72 that extend in a direction parallel to the longitudinal axis 64. Each rib 72 includes a first end 74 that is positioned adjacent to the distal tip 68 of the tab 38 and a second end 76 that is positioned adjacent to the base portion 66 of the tab 38. The ribs 72 have a minimum height at the first end 74 and a maximum height at the second end 76, with a tapered upper edge surface 78 extending along the ribs 72 from the minimum height to the maximum height. This defines a variable height of the ribs 72 along the length of the ribs 72. This allows a reduced insertion force for the tab 38 into the first opening 42 but still achieves sufficient deformation of the ribs 72 to achieve the interference fit.

Figure 6:
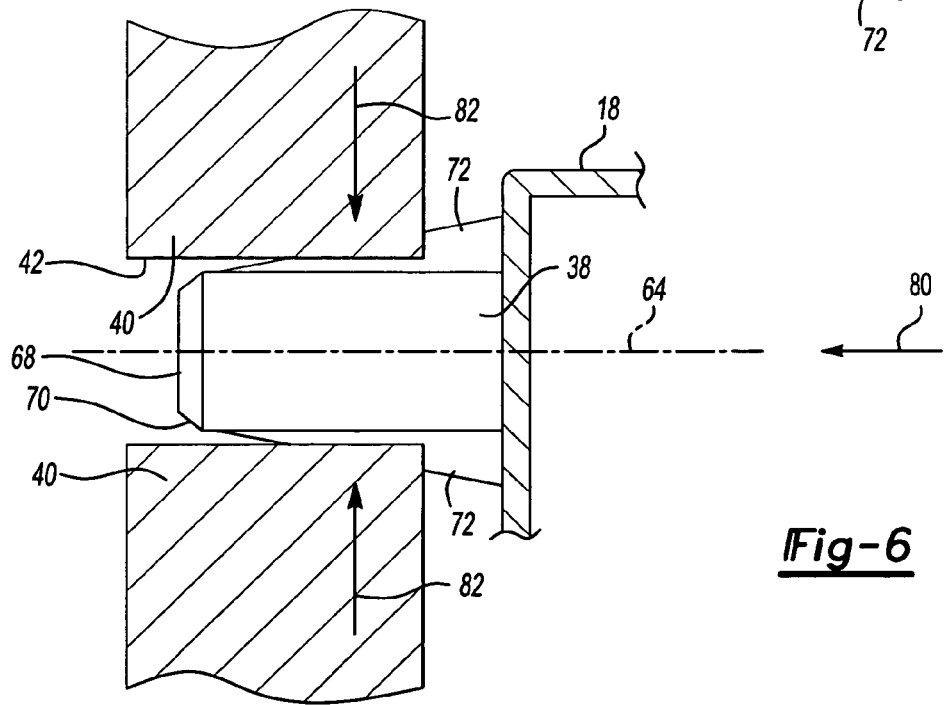
FIG. 6 is an installed view of the sensor housing incorporating the subject invention.

As shown in FIG. 6, the tab 38 is inserted into the first opening 42 with a linear insertion force applied in a direction parallel to the longitudinal axis 64, indicated with arrow 80. As the tab 38 is inserted into the opening 42, the ribs 72 are crushed or deformed in a direction transverse to the longitudinal axis 64, as indicated by arrows 82.

The subject invention provides a sensor assembly 12 that can be quickly and easily installed within a vehicle with minimal installer handling. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sensor assembly comprising:
    a housing having an exterior surface and an interior surface defining an inner cavity, said housing including a tab extending outwardly from said exterior surface and at least one aperture open to said exterior surface wherein said tab includes at least one extension member that plastically deforms in response to an insertion force applied to said tab as said housing is mounted to a vehicle structure;
    at least one sensor component mounted within said inner cavity wherein said sensor generates a signal representative of a vehicle characteristic; and
    at least one fastening element received within said aperture for attachment to the vehicle structure.

2. An assembly as set forth in claim 1 wherein said tab defines a longitudinal axis with said extension member deforming in a direction that is transverse to a linear insertion force applied in a direction parallel to said longitudinal axis.

3. An assembly as set forth in claim 1 wherein said at least one extension member is permanently deformed in a direction transverse to a longitudinal axis defined by said tab.

4. An assembly as set forth in claim 1 wherein said tab defines a longitudinal axis extending from a base portion to a distal tip, and wherein the insertion force is applied in a direction that is generally parallel to said longitudinal axis.

5. An assembly as set forth in claim 1 wherein said at least one extension member is deformed during insertion of said at least one extension member into an opening in the vehicle structure and prior to insertion of said fastening element into said aperture to provide an interference fit.

6. An assembly as set forth in claim 1 wherein said at least one extension member comprises at least one crush rib.

7. An assembly as set forth in claim 6 wherein said at least one crush rib includes a tapered surface.

8. An assembly as set forth in claim 6 wherein said at least one crush rib has a cross-section that varies from a base portion to a distal tip.

9. A method for mounting a sensor assembly to a vehicle structure comprising the steps of:
    (a) positioning a sensor housing adjacent to a vehicle structure;
    (b) aligning a housing tab with an opening in the vehicle structure;
    (c) plastically deforming a portion of the tab during insertion of the tab into the opening to achieve an interference fit; and
    (d) fastening the sensor housing to the vehicle structure.

10. A method as set forth in claim 9 wherein step (c) includes permanently deforming the portion of the tab during insertion prior to step (d).

11. A method as set forth in claim 9 wherein step (c) further includes forming the portion of the tab to include at least one crushable rib.

12. A method as set forth in claim 9 wherein step (c) is performed before step (d).

13. A method as set forth in claim 12 wherein step (b) further includes aligning a housing opening with a second opening in the vehicle structure and step (d) further includes inserting a fastener through the housing opening and into the second opening.

14. A method as set forth in claim 13 including the steps of forming the sensor housing from plastic and the vehicle structure from sheet metal.

15. A sensor assembly comprising:
- a housing having an exterior surface and an interior surface defining an inner cavity, said housing including a tab extending outwardly from said exterior surface and at least one aperture open to said exterior surface wherein said tab includes at least one extension member that deforms in response to an insertion force applied to said tab as said housing is mounted to a vehicle structure wherein said at least one extension member comprises at least a pair of crush ribs positioned on opposing sides of said tab;
- at least one sensor component mounted within said inner cavity wherein said sensor generates a signal representative of a vehicle characteristic; and
- at least one fastening element received within said aperture for attachment to the vehicle structure.

16. A sensor assembly comprising:
- a housing adapted to be mounted to a vehicle structure, said housing having an exterior surface and an interior surface defining an inner cavity, said housing including a tab extending outwardly from said exterior surface wherein said tab includes at least one crush rib that is plastically deformed in response to an insertion force for attaching said housing to the vehicle structure; and
- at least one sensor component mounted within said inner cavity wherein said sensor component generates a signal representative of a vehicle characteristic.

17. An assembly as set forth in claim 16 wherein said crush rib is defined by a cross-sectional area that varies from a base portion to a distal tip.

18. An assembly as set forth in claim 16 wherein said housing includes at least one aperture open to said exterior surface and wherein at least one fastening element is received within said aperture to attach said housing to the vehicle structure.

19. An assembly as set forth in claim 18 wherein said crush rib is deformed prior to insertion of said fastening element into said aperture.

\* \* \* \* \*